United States Patent
Radcliffe et al.

(10) Patent No.: US 12,259,911 B2
(45) Date of Patent: Mar. 25, 2025

(54) PERSONAL INFORMATION MANAGEMENT SYSTEM HAVING GRAPH-BASED MANAGEMENT AND STORAGE ARCHITECTURE

(71) Applicants: Justin Garrett Radcliffe, College Station, TX (US); Erik Michael Howard, Seguin, TX (US)

(72) Inventors: Justin Garrett Radcliffe, College Station, TX (US); Erik Michael Howard, Seguin, TX (US)

( * ) Notice: Subject to any disclaimer, the term of this patent is extended or adjusted under 35 U.S.C. 154(b) by 0 days.

(21) Appl. No.: 18/354,461

(22) Filed: Jul. 18, 2023

(65) Prior Publication Data
US 2024/0028622 A1    Jan. 25, 2024

Related U.S. Application Data

(60) Provisional application No. 63/390,552, filed on Jul. 19, 2022.

(51) Int. Cl.
| G06F 16/00 | (2019.01) |
| G06F 16/2457 | (2019.01) |
| G06F 16/2458 | (2019.01) |
| G06F 16/25 | (2019.01) |
| G06F 16/28 | (2019.01) |

(52) U.S. Cl.
CPC ...... *G06F 16/287* (2019.01); *G06F 16/24578* (2019.01); *G06F 16/2471* (2019.01); *G06F 16/25* (2019.01); *G06F 16/284* (2019.01)

(58) Field of Classification Search
CPC .... G06F 16/287; G06F 16/2471; G06F 16/25; G06F 16/24578; G06F 16/284
USPC .................................... 707/737, 769
See application file for complete search history.

(56) References Cited

U.S. PATENT DOCUMENTS

| 2010/0211924 A1* | 8/2010 | Begel ............ G06F 16/904 |
| | | 707/E17.069 |
| 2016/0378851 A1 | 12/2016 | Merdivan et al. |
| 2017/0293696 A1 | 10/2017 | Bendersky et al. |

(Continued)

OTHER PUBLICATIONS

International Search Report and Writen Opinion issued by the U.S. Patent and Trademark Office as the International Searching Authority (USPTO/ISA) for International PCT Application No. PCT/US2023/028060, mailed Oct. 23, 2023, 9 pages.

(Continued)

*Primary Examiner* — Chelcie L Daye
(74) *Attorney, Agent, or Firm* — Sprinkle IP Law Group

(57) ABSTRACT

Personal information management (PIM) systems and methods in which a plurality of datastores, including a graph datastore and a non-graph datastore are maintained. The graph datastore stores nodes representing each item of personal information data (PID) and edges representing relationships between the PID items. A user interface is generated to accept user input selecting a first PID item. A first node in the graph datastore representing the first PID item is identified and the graph datastore is searched to identify one or more additional nodes in the graph datastore which are connected by edges to the first node. One or more additional PID items that are represented by the additional nodes are retrieved from the non-graph datastore and the first PID item and the additional PID items are presented in the user interface.

20 Claims, 10 Drawing Sheets

(56) References Cited

U.S. PATENT DOCUMENTS

| | | |
|---|---|---|
| 2018/0081880 A1 | 3/2018 | Kennedy et al. |
| 2018/0157662 A1 | 6/2018 | Chin et al. |
| 2023/0131681 A1* | 4/2023 | Tong ..................... G06F 16/284 |
| | | 707/769 |

OTHER PUBLICATIONS

International Preliminary Report on Patentability issued by the U.S. Patent and Trademark Office as the International Searching Authority (USPTO/ISA) for International PCT Application No. PCT/US2023/028060, mailed Jan. 30, 2025, 7 pages.

* cited by examiner

PERSONAL INFORMATION MANAGEMENT SYSTEM HAVING GRAPH-BASED MANAGEMENT AND STORAGE ARCHITECTURE

CROSS-REFERENCE TO RELATED APPLICATIONS

This application is a conversion of, and claims a benefit of priority under 35 U.S.C. § 119(e) from U.S. Provisional Application No. 63/390,552, FILED Jul. 19, 2022, entitled "PERSONAL INFORMATION MANAGEMENT SYSTEM HAVING GRAPH-BASED MANAGEMENT AND STORAGE ARCHITECTURE," which is fully incorporated by reference herein for all purposes.

TECHNICAL FIELD

The invention relates to novel software architecture for a system that performs capture and management of Personal Information Data (PID) such as contacts, tasks/"to-do" items, projects, e-mails, notes, reminders, calendar, events, and documents. It utilizes graph database technology and provides unique functionality compared to existing software available in its ability to function based on direct database links between these items. The area of processes concerned with the management of PID is often referred to as "Personal Information Management" or "PIM".

BACKGROUND

The architecture of other solutions for managing PID comprises either a combination of disparate applications and datastores or applications that use older types of storage such as folders—e.g., Microsoft Outlook. There is significant opportunity to improve performance of computers hosting these data via an application service built upon "native" graph database technology (in other words, the graph database is implemented at a low level and is not superimposed over some other type of database technology).

Graph database technology began in proper with IBM's "Navigational Database" in the 1970's but it was not widely adopted as relational database management systems were preferentially adopted as the successor to database technology comprising unrelated "flat" file table structures. In the 1990's, "native" graph databases, both proprietary as well as "open-source" began to become viable for commercial use. Five broad categories of graphs have been identified in the market, namely, Social Graphs, Intent Graphs, Consumption Graphs, Interest Graphs, and Mobile Graphs. However, while graphs databases have been commercially available for several decades, the utility of graph database technology for PID was not apparent.

In 2006, a conference was sponsored by bthe National Science Foundation to bring together expert researchers in the field of Personal Information Management. Participants included academic as well as industry researchers from Microsoft and Google, among others. A book written by two of the conference's participants was published in 2007. It notes "One problem looms . . . and is often made worse by the very tools that are designed to help with these activities. This is the problem of information fragmentation. The information required to complete even a simple task, such as deciding whether to accept a dinner invitation for next Thursday, is often scattered in several forms, in several locations, on several devices . . . "

"Information has long been fragmented by physical location. But just as online access to digital information begins to reduce reliance on paper in physical locations, people must contend with a new, potentially even more vexing fragmentation of information by device, tool, and application" (pp. 270-271"Personal Information Management"; Jones, Teevan; Univ. Of Washington Press, 2007).

Author and lecturer about personal productivity David Allen, documented his struggles in 2018 to achieve a cohesive PIM application on his web site stating, "we've invested in two serious attempts at producing a software product that would do it (one in the mid-1990s and the last in the mid-2010s). Both ended in a "not yet" conclusion, after tremendous research in the technology and analysis of the market." At least one of these attempts to develop David Allen's cohesive PIM application software product was made by endeavoring to build an application atop Lotus Notes/Domino-leveraging the extensive infrastructure and development environment provided by that platform. As noted above, graph database technology had been commercially viable since the 1990s, but it was not considered to be useful in resolving the need for a cohesive PIM application software product.

The substantial investment in existing infrastructure in e-mail and other fragmented personal productivity software is probably a significant factor contributing to the widespread inability to recognize the potential of a new solution that provides the desired level of integration that has been sought in the field for several decades now. Disclosed herein are Direct Relationship Creation PIM systems (referred to as DRCPIMS, DRCPIMS systems, or DRCPIMS applications) address the unsolved needs identified researchers from Microsoft and others as documented in the 2007 book, by David Allen in the mid 1990's, and others presently.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

DRCPIMS is a software application that combines all aspects of Personal Information Management into a single application that is focused on the relationships between the elements of Personal Information Data (PID). DRCPIMS' technology enables working with PID in ways that, when compared to the technology of other PIM software, are more efficient in terms of computing resources consumed and for some use cases are impossible. It solves the aforementioned longstanding issues of "fragmentation" identified by experts in the field that have encumbered users of PIM software—needlessly consuming valuable time and inefficiently consuming computing resources.

Figure 1:
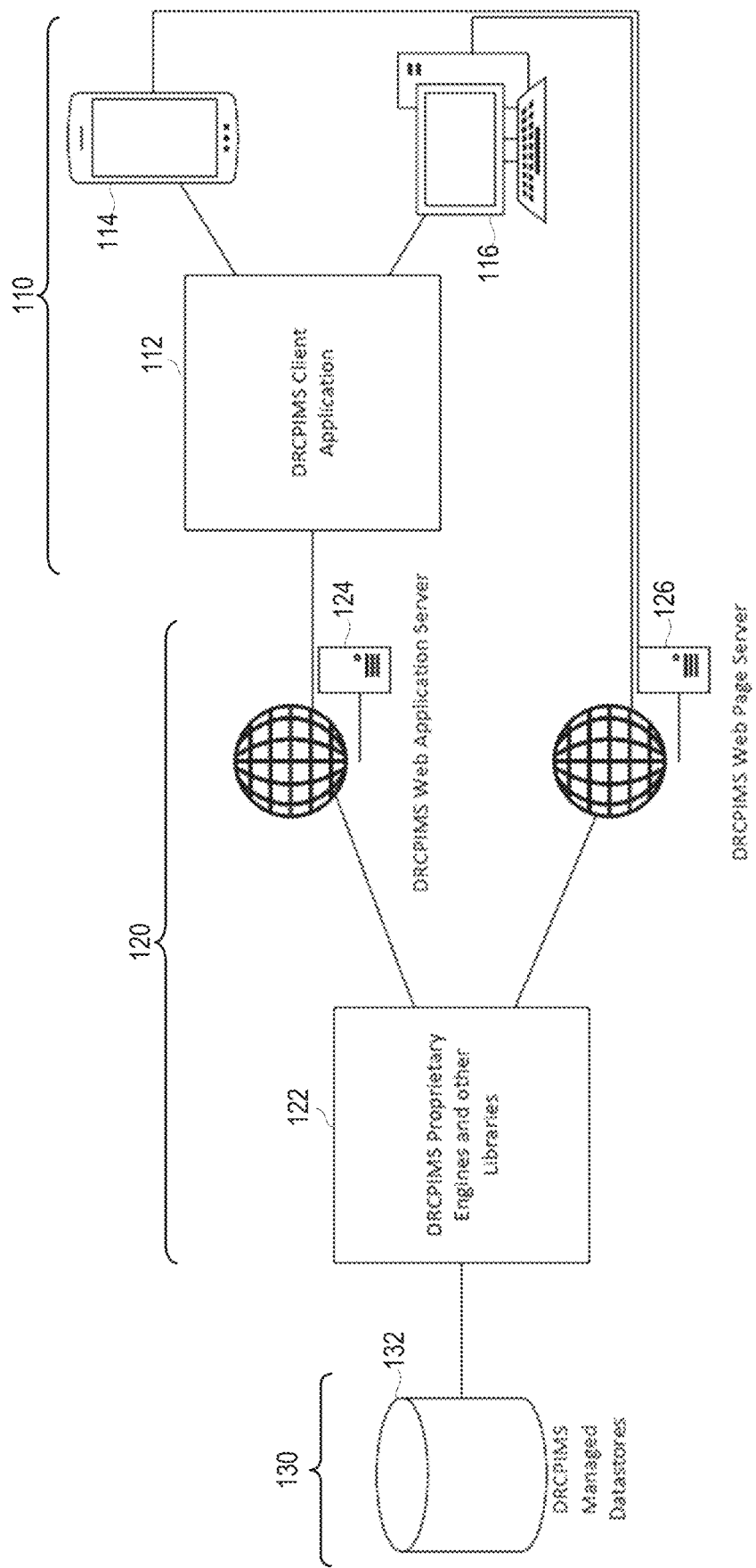
FIG. 1 is a diagram illustrating system components overview.

Referring to FIG. 1, a diagram is shown to illustrate an overview of the DRCPIMS topology in accordance with some embodiments. As depicted in this figure, DRCPIMS includes a client layer 110, a middle layer 120 and a managed datastores layer 130. Client layer 110 (which may also be referred to herein as a user-interface layer) comprises OS-specific applications (e.g., 112) such as native Android and native iOS, or a web-page application. Applications 112 may be executed by client devices, such as mobile devices 114 (e.g., smart phones, tablets or laptop computers), desktop computers, and the like.

Middle layer 120 comprises application specific logic and components that perform computing tasks and manipulate information for the system users. The managed information may include information in categories such as contacts, tasks, notes, meetings, events, reminders, projects, e-mails, files. These categories represent examples of the types of information that are managed by the disclosed embodiments, and are not intended to limit the type of information used by the application.

In some embodiments, middle layer 120 includes various proprietary engines and libraries 122, as will be described in more detail below. Middle layer 120 may further include various servers, such as DRCPIMS web application server 124 and DRCPIMS web page server 126. In this embodiment, DRCPIMS web application server 124 provides client applications (e.g., 112) to client devices (e.g., 114, 116) that execute the applications DRCPIMS web page server 126 provides web pages to these client devices.

In some embodiments, the categories of data (e.g., contacts, tasks, notes, meetings, events, reminders, projects, e-mails, files) handled by the system define a minimum set of features that give DRCPIMS the unique characteristic of uniting all aspects of PIM within one application in a way that is not achieved in existing systems. These embodiments focus on the relationships between PIM elements and allow the catalog of relationship definitions to grow via user input. DRCPIMS' architecture uses a graph database or other datastore to enable the systems disclosed herein to store relationships (edges) between any of the different categories of information that they process and store. In existing PIM software applications, it is not possible to identify and store relationships, regardless of their types, for information items in different categories. For example, it is not possible in existing systems to store relationships between emails and projects.

Managed datastores layer 130 provide repositories for the various types of data managed by the disclosed systems. As will be described in more detail below, one of the primary repositories comprises a graph datastore that stores individual items of the various different types of data (e.g., contact information, task information, notes, meeting information, event information, reminders, project information, e-mails, and files) as nodes in the datastore. The graph datastore also stores edges that define relationships between the different nodes in the datastore, particularly including relationships between nodes corresponding to data of different types, which cannot be handled by existing systems. Managed datastores layer 130 may include various other types of databases, repositories or other datastores, such as document databases, relational databases, key-value stores, file stores, and the like.

Figure 2:
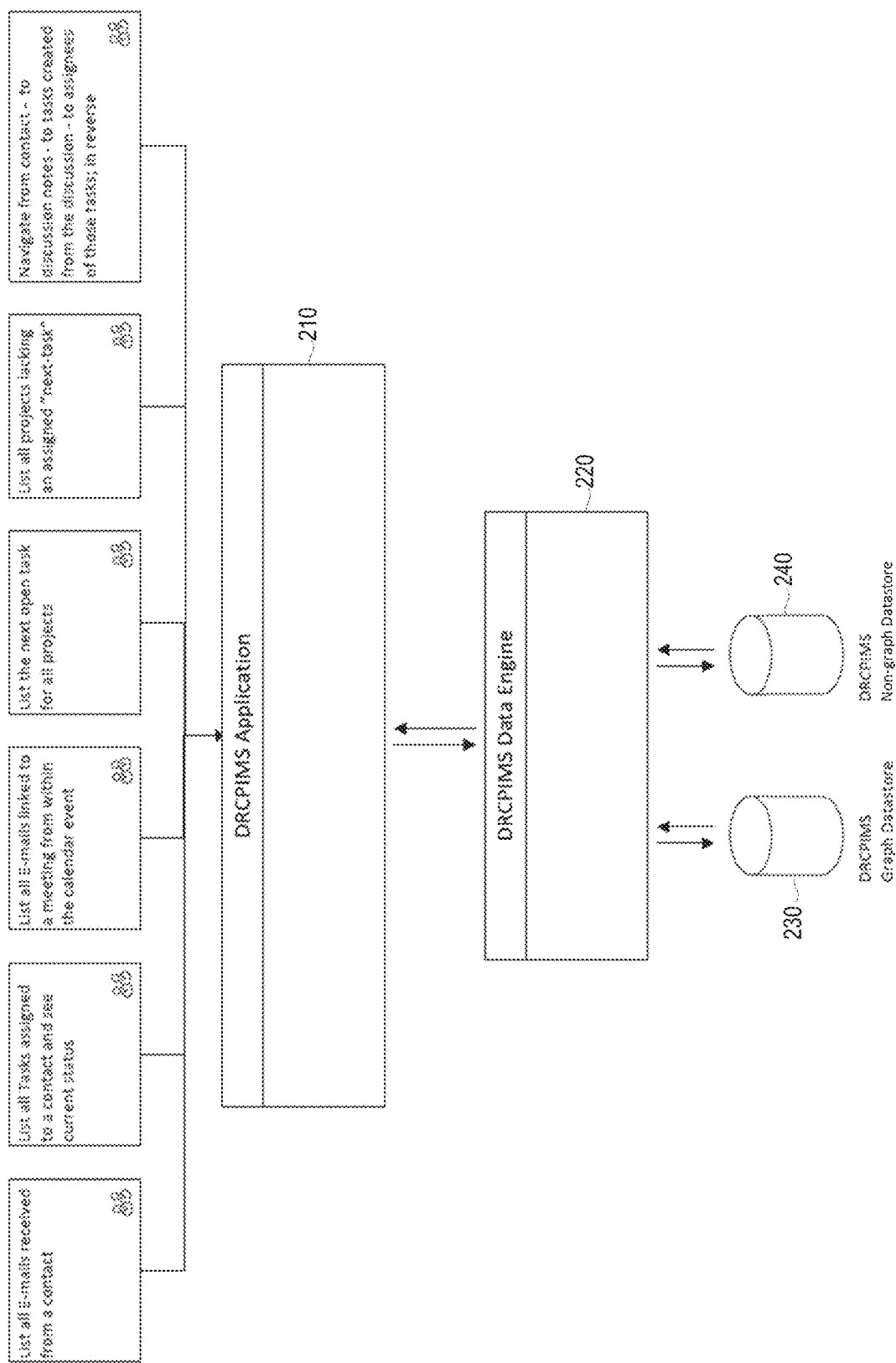
FIG. 2 is a diagram illustrating PIM use cases sample—DRCPIMS.
Figure 3:
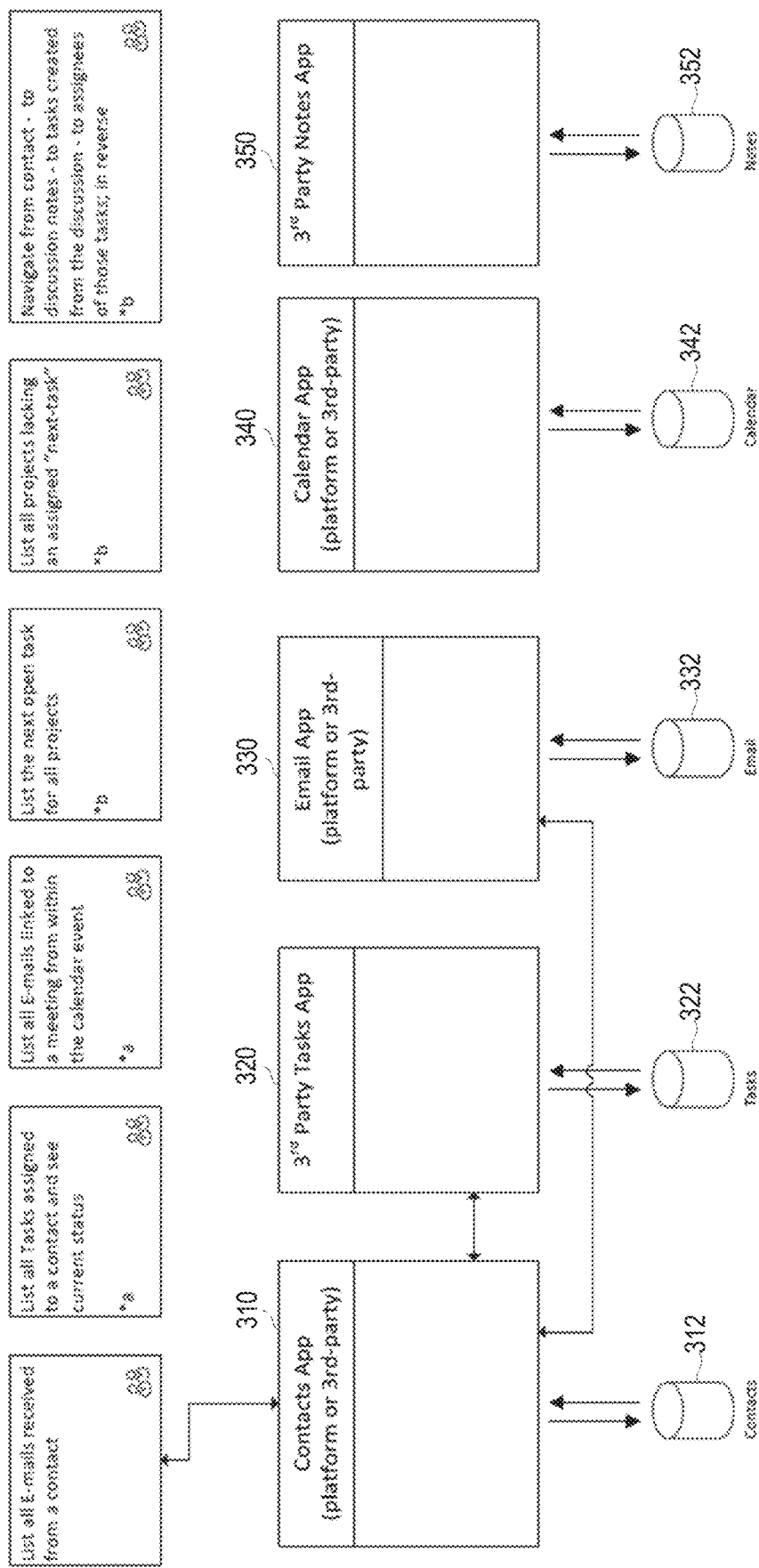
FIG. 3 is a diagram illustrating PIM use cases sample-utilizing a combination of platform-native applications (e.g., contact, calendar, e-mail apps on Android, IOS, etc.)
Figure 4:
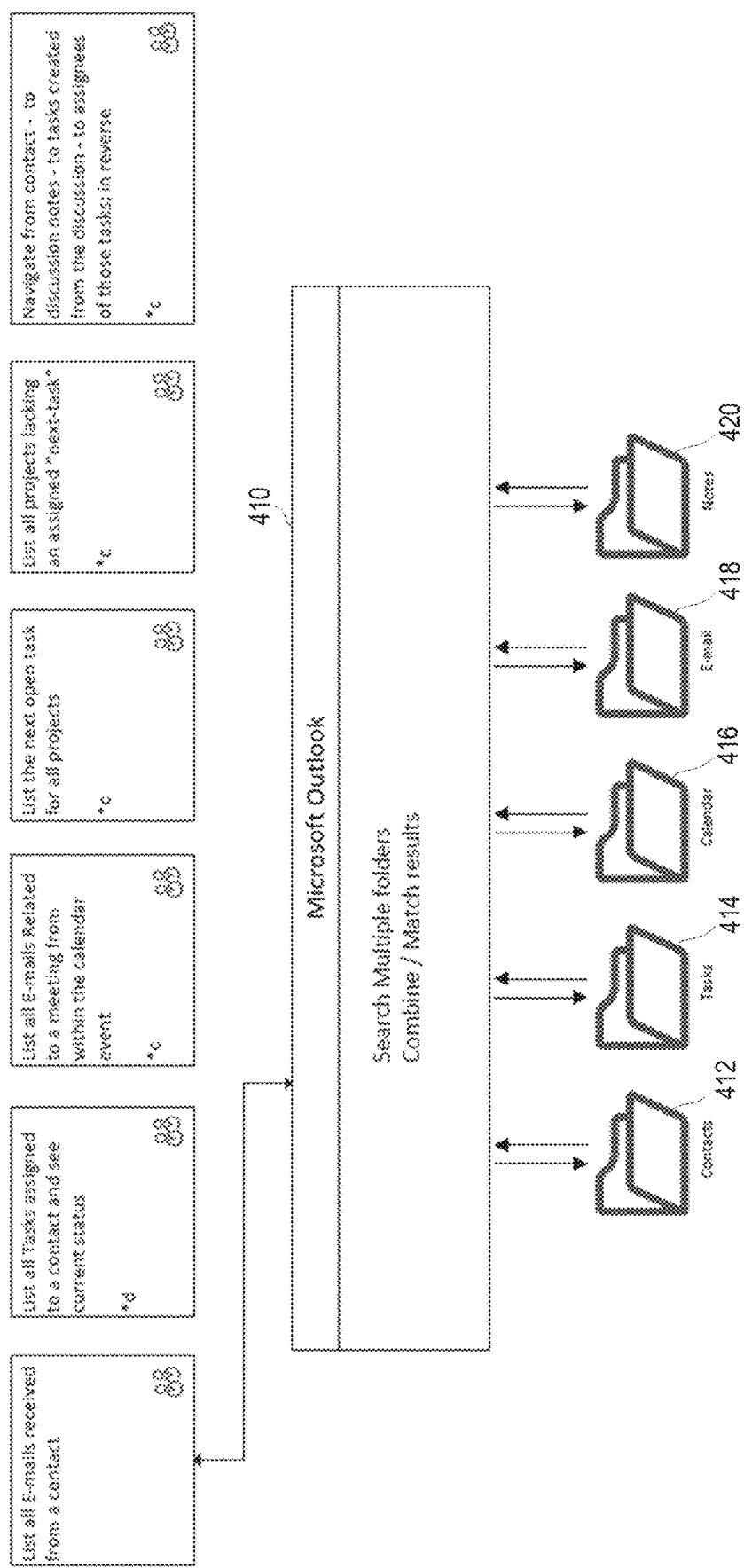
FIG. 4 is a diagram illustrating PIM use cases sample-folder storage within Microsoft Outlook (a monolithic application).

Before describing the disclosed embodiments in detail, it may be helpful to consider the capabilities and shortcomings of existing PIM systems in relation to the capabilities of the disclosed embodiments. FIGS. 2-4 illustrate and contrast, at a high-level, processing paths and storage mechanisms for a sampling of user activities. These figures show the same user activities as handled in DRCPIMS (FIG. 2) and two existing application paradigms, one of which utilizes platform-native applications (FIG. 3) such as Android contacts and e-mail, and one of which utilizes a single monolithic application (FIG. 4) that covers data elements for multiple different functions (e.g., email and contacts).

FIGS. 2-4 illustrate a sampling of six PIM use cases. The use cases (tasks) considered here include:
- listing all emails received from a particular contact;
- listing all tasks assigned to a particular contact and showing the current status of the tasks;
- listing all emails linked to a meeting from within the calendar event for the meeting;
- listing the next open task for all projects;
- listing all projects that lack an assigned next task; and
- navigating from a particular contact, to discussion notes, to tasks created from the discussion, to assignees of those tasks (or navigating these different types of information in reverse).

Referring to FIG. 2, a diagram is shown to illustrate the capability of a DRCPIMS application to handle these six tasks. As shown here, each of the six tasks can be performed by DRCPIMS application 210. The or enabled through the use of the graph datastore to store nodes corresponding to the different types of data that must be accessed to accomplish each of the tasks, as well as edges defining the relationships between the nodes (i.e., the data items of different types). Thus, DRCPIMS application 210 can identify and access data items of different types using DRCPIMS data engine 220, which manages the different types of data items and stores them in datastores such as DRCPIMS graph datastore 230 and DRCPIMS relational datastore 240.

Referring to FIG. 3, a diagram is shown to illustrate the capability of a combination of conventional PIM applications to handle (or not handle) the six tasks. As shown here, the combination of conventional PIM applications includes a contacts application 310, a tasks application 320, an e-mail application 330, a calendar application 340, and a notes application 350. Each of these individual applications may be a third-party application. The contacts application, the e-mail application and the calendar application may, in some embodiments, be applications within a single PIM platform. In this example, each application has a corresponding datastore (312, 322, 332, 342, 352).

Considering the first task—listing emails received from a particular contact—conventional contacts application 310 is capable of interacting with email application 330 to identify all of the emails received from the selected contact. In regard to the second task—listing all tasks assigned to a particular contact and showing the current status of the tasks—contacts application 310 is capable of interacting with third party tasks application 320, and the applications are capable of accessing their respective datastores (312, 322), but the task cannot be performed using the menus and features that are provided in the existing applications.

As to the remaining four tasks, the tasks cannot be accomplished using the existing individual applications. The applications do not have access to all of the required data so it would not be possible for the applications to perform the task, even if they were capable of interacting with each other (which itself is not possible between some of the applications).

Referring to FIG. 4, a diagram is shown to illustrate the capability of a monolithic application to handle (or not handle) the same six tasks. As shown here, the monolithic PIM application 410 includes features and folders for contacts (412), tasks (414), calendar (416), email (418) and notes (420). Similar to the scenario for the combination of individual applications, monolithic application 410 is capable of handling the first task—listing emails received from a particular contact. In regard to the second task—listing all tasks assigned to a particular contact and showing the current status of the tasks—monolithic application 410 has access to the required data, but the task cannot be performed using the menus and features that are provided in the existing monolithic application. As to the remaining four tasks, the tasks cannot be accomplished because monolithic application 410 does not have access to all of the data that would be required to perform the tasks.

FIGS. 2-4 show that it is not feasible to perform the illustrated use cases using two common PIM application design methodologies. On the other hand, these figures show that DRCPIMS is able to perform the tasks of the illustrated use cases, and is therefore the most capable of the three different architectures.

Figure 5:
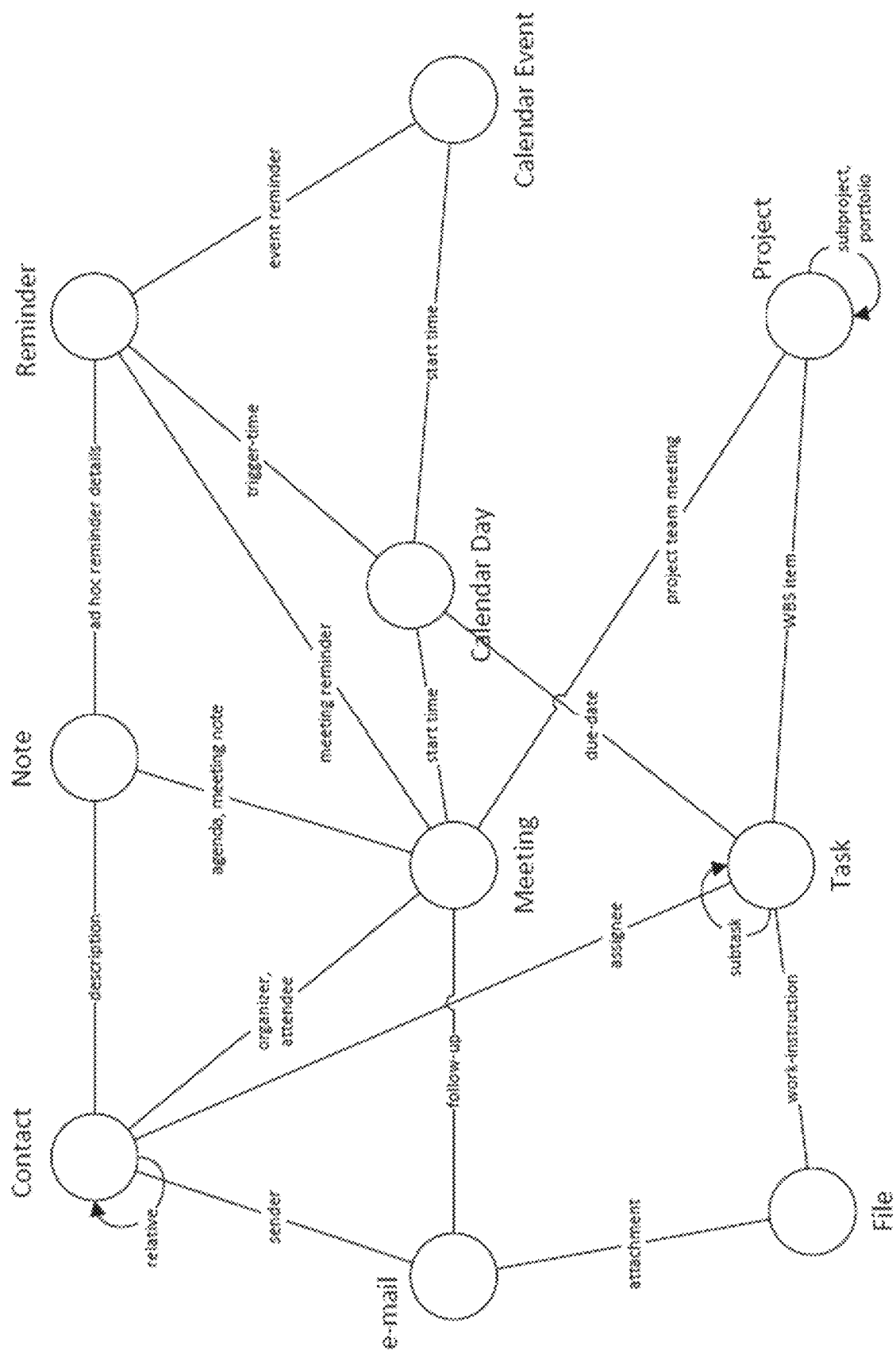
FIG. 5 is a diagram illustrating PIM entity linking overview with sampling of relationships.

FIG. 5 represents the internal node-edge structure of DRCPIMS which is a key component of its novel approach to PIM and illustrates the principle underlying the capabilities in handling the sampling of use cases. FIG. 5 is provided to illustrate the node/edge structure of the graph datastore, which allows the information handled by the disclosed embodiments to maintain the relationships between the many different types of information items and to provide related information to a user in scenarios such as the use cases depicted in FIGS. 2-4. FIG. 5 is not intended to be limiting, nor to define all the possible relationships, nor precisely label terminology within the graph, nor to define all of the possible types of relationships built into the disclosed embodiments.

DRCPIMS' comprehensive PIM functionality provides opportunities to reduce network traffic and storage IO inherent to coordinating processing with peer integrations among non-DRCPIMS required to deliver similar functionality.

In a multi-user or organization environment, DRCPIMS provides significant opportunities for reduction in storage space as discussed in the sections herein regarding the e-mail and file hosting engines.

Figure 6:
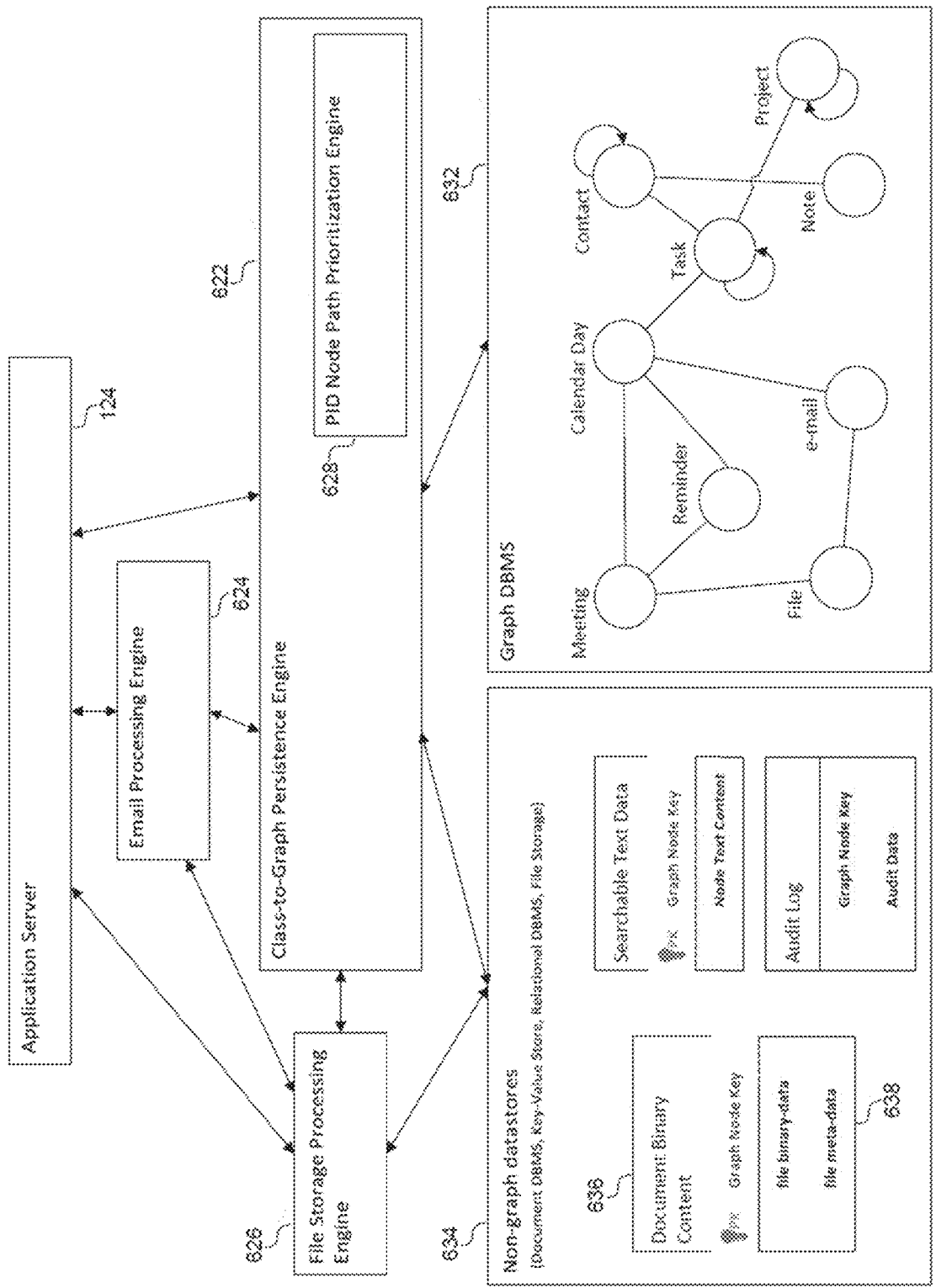
FIG. 6 is a diagram illustrating proprietary engine components.

Referring to FIG. 6, a diagram is shown to illustrate the components of a DRCPIMS system in accordance with some embodiments. This figure shows the various engines that may be used to implement the functions of the middle layer of the system, and also shows some of the different types of datastores that are used to enable the identification and presentation of related pieces of information that are beyond the capabilities of existing systems.

The proprietary components of DRCPIMS' middle layer 120 coordinate IO between multiple types of Datastore Management Systems that comprise the "managed datastores" layer 130. In this embodiment, these datastores include graph 632, relational 634, document 636, and key-value store 638. DRCPIMS stores all data that it controls, as this facilitates the most efficient use of computing resources for storing and querying the data in terms of storage footprint, network bandwidth, processor cycles, and I/O at storage external to DRCPIMS. Data is segregated and stored by type in order to leverage the strong traits of each type of datastore relative to one another—flexible relationship structure within a native graph database management system (DBMS), searchable text within relational DBMS storage, and large binary object storage within a document key-value store.

DRCPIMS storage is managed by three components that interact with one another to provide the full set of functionalities. The three components are: a class-to-graph persistence engine 622, an email processing engine 624, and a file-storage processing engine 626.

The problem of data isolation illustrated within FIG. 3 could be mitigated to a degree (although not to the extent of the DRCPIMS system) by developing an application that persists little to none of its own data, but rather principally coordinates interaction between datastores external to the DRCPIMS application. This could be termed a "broker" approach and technology exists within the domain of graph datastores to enable this under the title of "Resource Description Framework" (RDF). A "broker" approach, however, is too confined in general by legacy interfaces and structures of the applications that are sought to be connected and the complexity related to this is amplified as the number of devices targeted grows because it would have to utilize device native interfaces in many cases which vary between platforms. This approach was evaluated and was rejected as it would be unable to match the set of features and performance provided by DRCPIMS.

In addition to being unable to offer a comparable feature set, a "broker" solution would consume more computing resources than a solution that utilizes "native" graph datastore technology. Coordination between multiple physically separated resources would consume more network bandwidth, introduce unpredictable latencies into application processing, incur additional security processing overhead, and require a higher amount of CPU cycles compared to native graph, as the broker is limited to computing and inferring relationships between information located within different siloes based on comparing data such as email addresses. This is in contrast to having the data integrated with native graph datastore structures designed to provide performant traversal of relationships, as in the disclosed embodiments. DRCPIMS takes advantage of the physical storage structure of native graph technology to provide an application that comprehensively covers and makes all elements of PIM information categories relatable to one another and is able to be queried more efficiently than with current PIM application architectures.

Returning to the three proprietary engines, FIG. 6 provides a graphical overview of these application components' relationships to each other and to the storage systems. The component with primary responsibility for maintaining all relationships is the class-to-graph persistence engine 622. The email and file storage engines both perform most IO via the class-to-graph persistence engine. The class-to-graph persistence engine also coordinates manages all IO that is split between non-graph DBMS and graph DBMS. For example, it synchronizes complex query activity between the graph and other datastores (632, 634). An example of a complex query is one that follows relationships between projects-notes-emails-tasks and is modulated with natural language search input over text content. The class-to-graph persistence engine coordinates the relationship traversal within graph DBMS 632 with the natural language text search provided by non-graph datastores 634—executing in parallel where possible and combines the query results from the two data sources and translates it into the appropriate class hierarchy for consumption further up within the application hierarchy. A key element of this coordination involves treating graph DBMS 632 as the system of record for "key" values identifying PID data and using that same "key" within non-graph DMBS structures to match the searchable text and other content, such as content of the audit log, with its 'master' record in graph DBMS 632.

Figure 7:
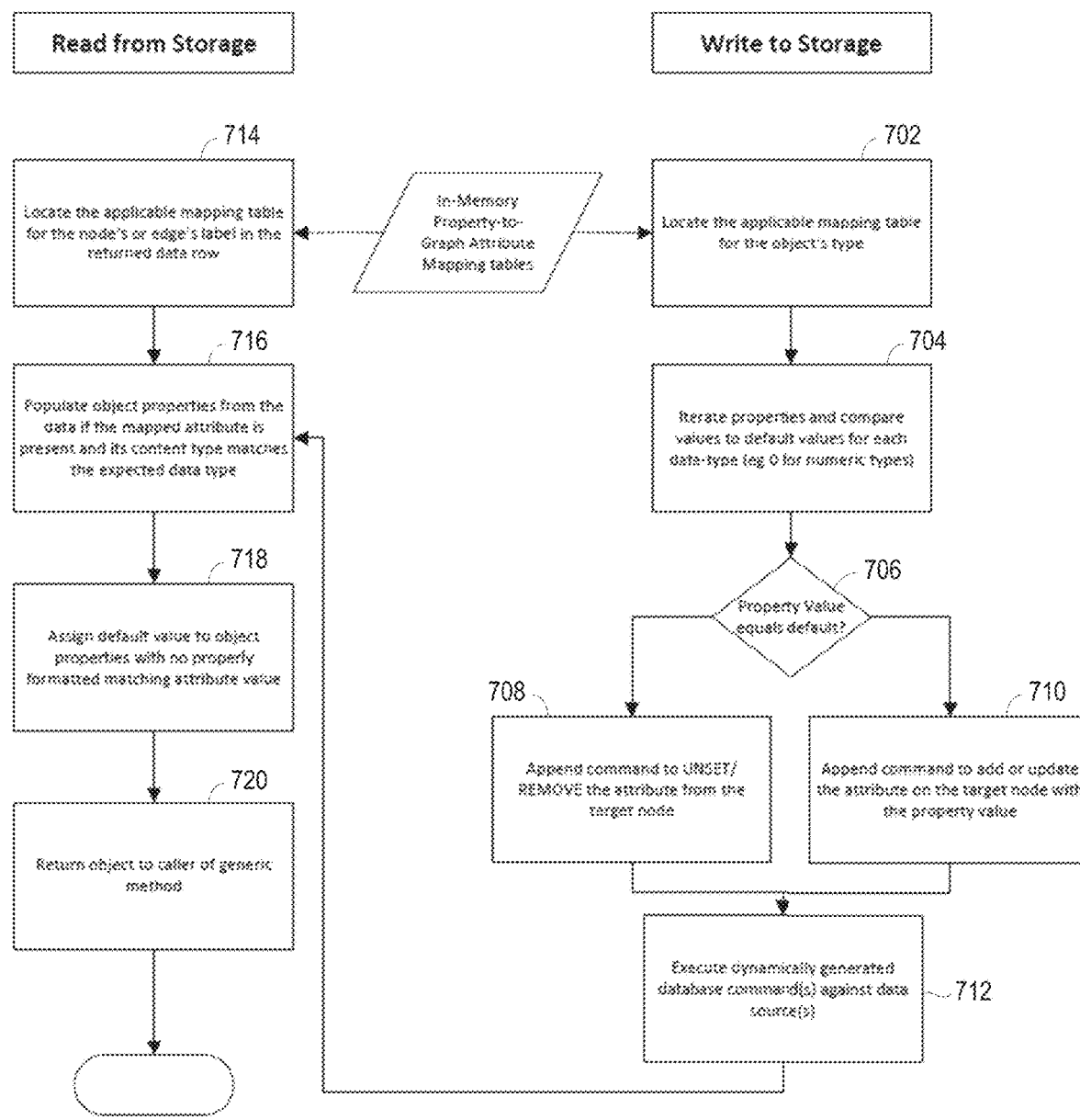
FIG. 7 is a flowchart illustrating a class-to-graph persistence engine.

FIGS. 6 and 7 illustrate key aspects of functionality with respect to dynamic query generation and synchronization of datastore object attributes performed by class-to-graph persistence engine 622 that accompanies DRCPIMS. Graph DBMS datastore 632 used in DRCPIMS is "schema-less"—i.e., it lacks the concept of defined tables and rows. Instead, nodes and relationships are tagged with labels and attributes. The names and data types of such are not bound to any schema as is the case with most relational DBMS structures. For purposes of this document, these dynamic node and relationship (edge) properties are considered 'pseudo-schema' and DRCPIMS' class-to-graph persistence engine dynamically synchronizes their presence on graph members for consistency with application classes ("types").

Functionally, class-to-graph persistence engine 622 translates nodes and relationships of unknown "types" that are returned from queries into known "types" for the middle (application) layers depicted in FIG. 1. It accomplishes this with a set of abstract classes, interfaces, concrete classes, and "generics" constructs (language features of Java, C++, and C#-among a few others).

The DRCPIMS' class-to-graph persistence engine examines data in the set of results returned from a graph datastore query, determines the type, and then uses an internal mapping utility to map the record's properties to concrete class instances. Its internal mapping and translation utilities handle faults gracefully in the cases of extra properties, missing properties, and mis-named properties (relative to the type of data deemed to be expected within the records being read.

In another embodiment, the class-to-graph persistence engine may be configured to convert all graph DBMS output first to key-value pairs of untyped data, then return the key-value pair collection to a higher layer for conversion to native data types—thus reducing the number of abstract classes.

In the embodiment depicted in FIG. 6, the class-to-graph persistence engine contains a sub-component named the "PID node path prioritization engine" 628. Its primary purpose is to assist with predicting the most relevant results in the output of the search user interface component. As the user navigates within the application, PID node path prioritization engine 628 adds specially labeled relations between existing PID-representing nodes to capture this navigation path. Every time the user navigates from any node to another, a relation is added to the graph by PID node path prioritization engine 628. Other events such as editing node data and selecting a node from search results output may similarly trigger capture of the event via a relationship within the graph.

Queries generated by class-to-graph persistence engine 622 utilize graph-native query functions and semantics to prioritize results utilizing the technique of node weighting. PID elements shown to the user within the search user interface output list and global navigation user interface components are ordered in this embodiment by predicted relevance by a rank determined by, at least in part, the weight of each PID node in the result-set as determined by the frequency of navigation-triggered relationships and chronologically via clustering of timestamps on the same navigation-triggered relations.

Figure 10:
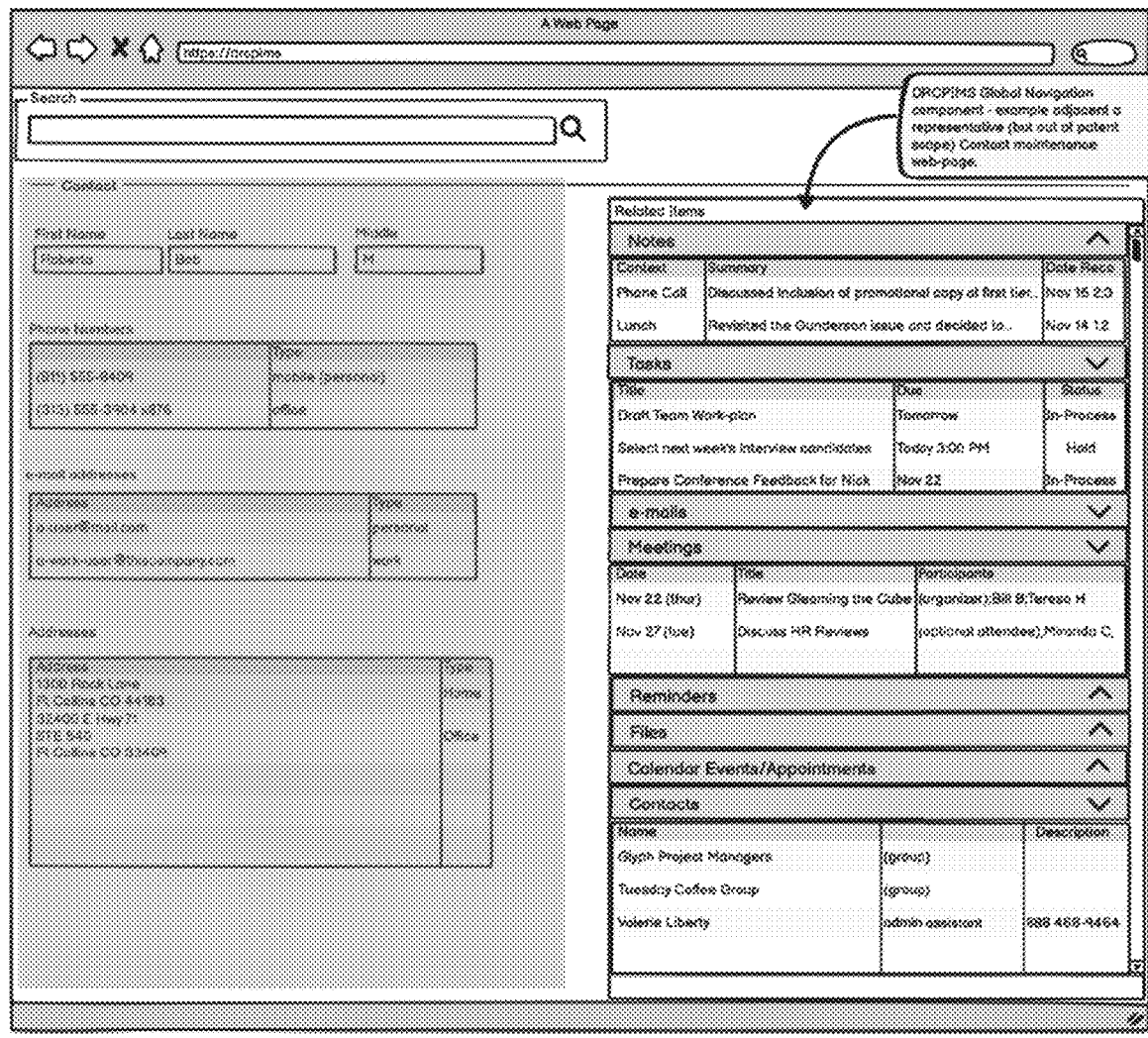
FIG. 10 is a diagram illustrating DRCPIMS global navigation user interface component (in context of detail view for a "contact").

An example of a global navigation user interface is shown in FIG. 10. This user interface shows that, if a particular contact is selected, the system will display conventional contact information (phone, email, address on the left side of the interface) and will also find nodes of any type related to the contact and will display those under corresponding type headings in the global navigation component on the right side of the interface. The global navigation component includes all of the stored information related to the contact. As noted above (see, e.g., FIGS. 3-4), the global navigation component includes items of information that cannot be identified and displayed in existing systems. The user can then navigate to any of the items displayed in the global navigation component, which is a feature that is not available in existing PIM systems.

Navigation-triggered relations are attached to nodes without regard to the existence of any other types of DRCPIMS other inter-node relationships in the PID graph. In practice, this means that if a user navigates from project "a1" to task "33" a navigation-triggered relationship will be placed between those two nodes regardless of whether a relationship already exists that carries a label designating that task "33" belongs to project "a1". This could be especially useful in a multi-user environment where nodes that are the subjects of high navigation activity will appear at the top of the navigation lists for workgroup members, and then migrate downward and off the list naturally as they lose relevance. This function also facilitates a further benefit to the user by enabling deep searches through the graph to identify objects whose relationship should be (or should have been) captured by the user, but the details of one of the items sought is not remembered by the user clearly enough to readily find it via normal searching. For instance, the task example may have been created in a different project's context, but then the user navigated from that task to the correct project and forgot to redirect the task's parent node to the correct project. Deep searching via the search user interface component and navigation retracement are valuable tools for the user in locating such an item.

PID node path prioritization engine 628 also implements an optional direct first-in-first-out (FIFO) list within the graph that is also constructed from navigation activities. As new items are navigated to within the application, the oldest item drops off the list. The length of each user's list may be adjusted by the user. This list is available throughout the DRCPIMS application to enhance navigation suggestions and graph-traversing query output.

DRCPIMS raises the level of functionality available with respect to integration of email with other PID. This is important due to the ubiquity of e-mail as a communication medium. DRCPIMS provides two levels of enhancements to email in this regard. The lower tier of integration comprises interaction with email that is hosted externally to DRCPIMS via 'connectors' built on top of common email standards and protocols such as SMTP and IMAP. This allows emails to be related to other PID entities within DRCPIMS while the system of record for the email remains external to DRCPIMS. In this instance, DRCPIMS functions in the role of a broker coordinating with an outside service. This is an acceptable use case facilitated by the level of maturity extant within long-established e-mail systems, protocols, and standards and the applicability of standards across devices.

The higher level of integration is provided by hosting email within DRCPIMS. This provides the highest level of efficiency available to users as well as with respect to consumption of computing resources. This is most notable when hosting for organizations, as an email within an organization that would be replicated in its entirety amongst multiple mailboxes in other systems exists in DRCPIMS as a single node with comparatively very small relationships to the applicable contact nodes as will be described in detail in upcoming sections.

Figure 8:
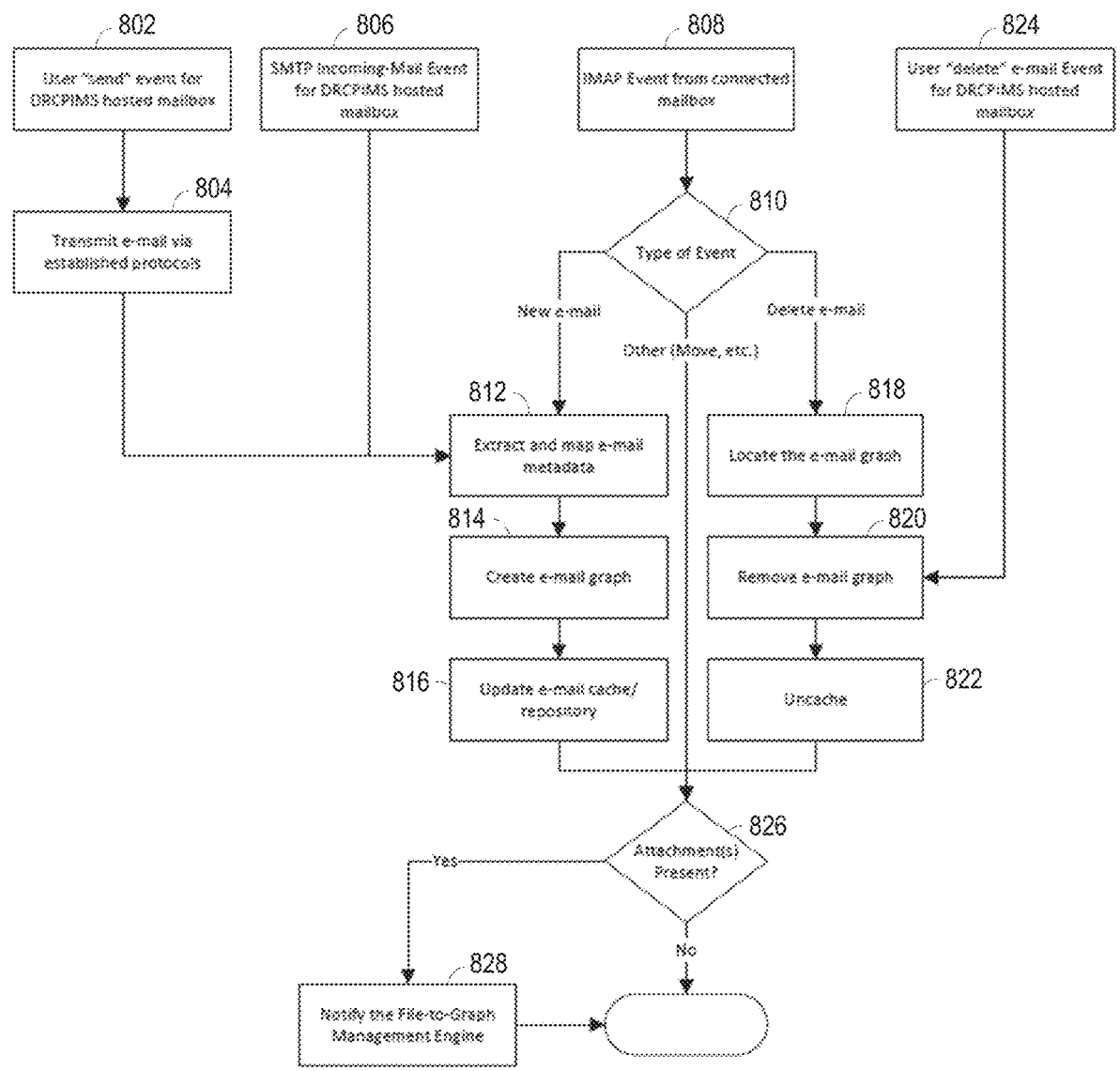
FIG. 8 is a flowchart illustrating for email-to-graph management engine.

DRCPIMS implements e-mail functionality in two ways. FIG. 8 presents an illustration of the different paradigms within DRCPIMS and entry points to the e-mail engine and where the processing paths for the two methods intersect.

The first way is through a helper library that interfaces with mailboxes external to DRCPIMS. Users configure the e-mail accounts they would like to connect. DRCPIMS monitors the external accounts via standard e-mail protocols (e.g. IMAP). The e-mail management engine processes mail events to create node representations of received e-mails that become integrated into the user's graph of PIM element nodes. This is illustrated in steps 808-822 of FIG. 8.

At step 808, an IMAP event from a connected mailbox is detected. The DRCPIMS application determines at step 810 whether the event corresponds to receiving a new e-mail, deleting an e-mail, or taking some other action with respect to an e-mail (e.g., moving the e-mail). If the e-mail is new, the application extract and maps the e-mail metadata (step 812), creates a corresponding node in a graph datastore (814) and updates an e-mail cache/repository with the information from the e-mail (816).

At this point the e-mail is available to be consumed within the DRCPIMS application via being linked to other elements. The e-mail management engine manages edges where possible based on information embedded within the e-mail (e.g. automatically creating edges to "contact" nodes—linking the sender of the e-mail to existing elements within the user's graph). This relationship enables the efficient retrieval of e-mails associated with a contact, avoids a CPU costly 'search' when looking for e-mails from a particular sender, links all e-mails to that contact even if their contact record contains multiple e-mail addresses, and preserves links between contact and e-mail message even if a contact's e-mail address is changed or is removed from their contact record.

The e-mail management engine initializes and manages the lifecycle of some elements' nodes to facilitate full functionality within the DRCPIMS application. For example, if an e-mail's sender is not found from the user's existing graph of contacts, then a contact will be created that is tied to the lifecycle of the e-mail. The user may wish to promote that system-managed "contact" to a user-defined "contact" or append the e-mail address to an existing "contact". In either case, the e-mail management engine is aware of the revised/upgraded status of the object and adjusts the lifecycle management it performs accordingly as well as handles required changes to relationships such as redirecting edges from a system-managed to a user-defined "contact" upon addition of the e-mail address by a user to a user-defined "contact".

Referring again to FIG. 8, if the event corresponds to deletion of an e-mail, the DRCPIMS system locates the corresponding node in the graph datastore (818), removes the node from the datastore (820) and then remove the information corresponding to the e-mail from the e-mail cache/repository (822). If at step 810 the event corresponds to some type of event other than a new e-mail or deleted e-mail, the event will be processed appropriately (e.g., updating information stored in the graph datastore or other datastores). Thes actions are not explicitly included in the figure. For any of the events that are considered at 810, if there is an attachment present (826), the file-to-graph management engine is notified (828) so that it can appropriately process the attachment.

The e-mail management engine saves network traffic and improves the user experience by caching certain properties of the e-mail to facilitate full functionality within DRCPIMS such as being able to search e-mail content locally to DRCPIMS—eliminating the need in many cases of submitting a search request over the network to a remote mailbox server.

DRCPIMS e-mail management engine can also offer mailbox hosting. The DRCPIMS application handles events for the DRCPIMS-hosted email in a manner similar to the handling of the externally hosted e-mail (e.g., sending e-mails as shown in steps 802-804, receiving e-mail as shown in step 806, and deleting e-mail as shown in step 824), but the processing may be more streamlined since the e-mail is integrated with other components of the DRCPIMS application.

Whether the application uses connected e-mail or hosted e-mail, the e-mail engine can optimize storage by managing each thread of e-mail communications and only saving or caching the differences as new messages are appended to the thread. The e-mail engine can further optimize storage with respect to e-mail attachments by comparing attachments in messages existing in the thread to newly received messages to determine whether an attachment is identical to a previously cached or stored file.

In an organization hosted scenario (with DRCPIMS 'hosted' e-mail), e-mail storage requirements can be drastically reduced as the DRCPIMS e-mail engine stores e-mails and attachments once per organization (whether sending from the organization or receiving into the organization) and connects the messages in the thread to contact and user nodes within the organization allowing the organization's user mailboxes to share the same physical instances of messages and attachments. Additionally, this design yields benefits for data integrity as the possibility of differing versions of an e-mail existing in one mailbox having been edited, and in the original form in other mailboxes is eliminated.

DRCPIMS can be considered a foundation for a new level of capabilities brought to the field of PIM software applications. Without altering the foundation, it can be expanded in the future to provide integration with platform native applications on a variety of devices such as integrating with SMS messaging as well fill the need for an instant messaging platform for enterprises. This would provide the capability to keep this form of communication, in addition to the existing capability for e-mail, to be archived with the relevant meetings, tasks, projects, etc.

Figure 9:
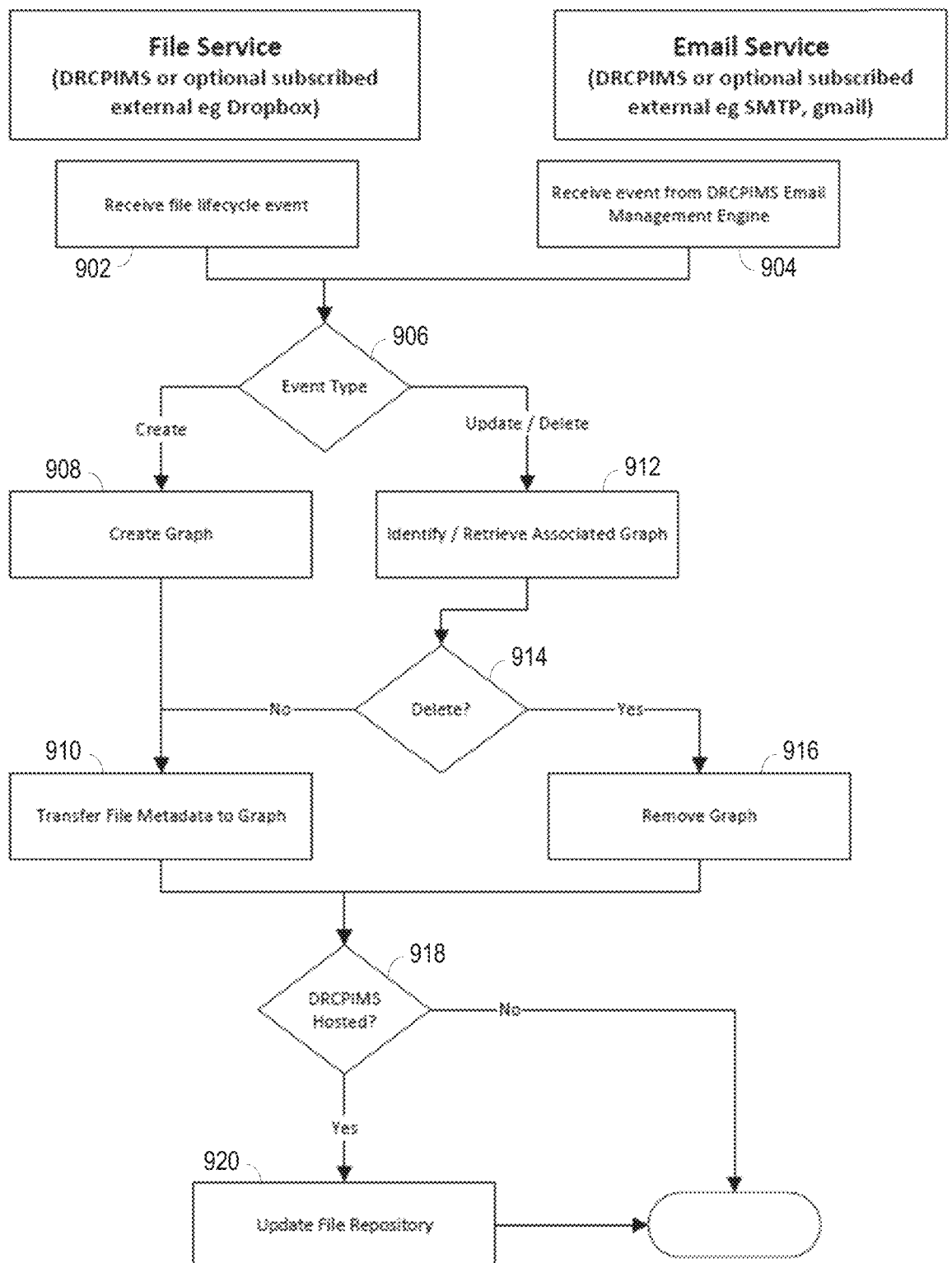
FIG. 9 is a flowchart illustrating for file-to-graph management engine.

DRCPIMS includes a file to graph management engine component (also referred to as a file storage processing engine, see FIG. 6, 626). The component offers file functionality at two levels: connected (to an external file service such as Dropbox) and hosted. FIG. 9 illustrates, at a high level, the methodology and commonalities in processing for each level.

As illustrated in FIG. 9, the DRCPIMS system receives a file life cycle event, either from a user of the application (902) or from a web-hook/callback subscription (904). The DRCPIMS application determines the type of the event (906) and processes it accordingly. For instance, if the event is a file—create event, the application creates a graph node corresponding to the file (908) and then transfers metadata corresponding to the file to the associated graph node (910). If, at 906, the file event is determined to be an update or delete event, the application identifies the associated graph node and retrieves it if necessary (912). If the event is a delete event (914), the graph node corresponding to the file is removed from the graph datastore (916). If the event is an update rather than a delete, the application updates the metadata in the corresponding graph node (910). If the file service is hosted by the DRCPIMS system (918), the application makes corresponding updates to the file repository (920). If the file service is externally hosted, the update to the file in the external repository is handled outside of the DRCPIMS application.

Thus, in the case of "connected" DRCPIMS (connected to an external file service) the DRCPIMS application creates nodes representing files and caches metadata obtained from the connected source, such as the file name, comments, and limited amount of text from relevant files, to facilitate functionality within DRCPIMS for searching and linking the file to other DRCPIMS elements. In the case of "hosted" DRCPIMS (where the DRCPIMS system provides its own file service), metadata providing functionality in DRCPIMS exists as part of the file's definition within DRCPIMS and does not need to be cached. DRCPIMS uses common storage differential algorithms to provide file versioning. File versioning is configurable, but for some use cases, file versioning is mandatory, and versions may need to be retained indefinitely regardless of versioning settings. In such cases, file versioning is managed transparently by the file to graph management engine.

DRCPIMS coordinates with other application services, in particular the e-mail management engine, to ensure that only a single instance of a file exists when referenced as an e-mail attachment and preserves the reference to the version of the file that existed at the point in time when it became part of an e-mail thread—optimally meeting the needs of both data auditability as well as storage optimization. When a file that has historically significant references is deleted by a user, the file to graph management engine transparently makes a byte-copy of the file to a special location and then proceeds with removal of the file from the storage area that the user interacts with and updates nodes and edges accordingly so that the file content is preserved in its historically significant context but is no longer searchable and usable from the perspective of the user experience—i.e., within the DRCPIMS menu and global navigation component, etc.

It should be noted that the graph structure illustrated in FIG. 5 includes a node representing a 'calendar day'. DRCPIMS uses a node to represent a calendar-day in most instances where a date is present in the data.

In relational DBMS architectures, dates—such as the date of a meeting, or the due date of a task, would typically be implemented as columns of a table. The approach taken in DRCPIMS ensures that only a single instance of a user's calendar's day is created with all relevant nodes referencing that shared instance. The net effect of this is reduced storage requirements and improved query performance as this structure fits the GDBMS paradigm that is optimized for relationship traversal. In effect, the graph DBMS's query engine would locate the single node for a given day, then be able to leverage relationship navigation for a more performant retrieval of related nodes than what could be accomplished via a functionally similar relational DBMS query that would first scan indexed content of a table's rows.

If a 'time' is relevant for a node's relationship to the calendar-day node, it is captured as a property of the relationship that links a node to the relevant calendar-day node. This provides a small but repeatable savings of space whenever a time is not necessary over a common method of storing dates only in datatype structures that also include space allocated for time—but where the time is stored as all zeroes.

There may be numerous embodiments of the DRCPIMS systems and methods. For instance, one example of a computer-implemented method according to an embodiment of the present invention comprises:

receiving information entered by the user under the categories: contacts, tasks, notes, meetings, events, reminders, projects and storing that information in dedicated non-transitory storage including a node representation of each element; and accessing and selecting e-mails and files from designated sources, automatically generating node representations of all items received or accessed;

wherein the user-interface supports creating edges between the node representations;

wherein edges may be automatically generated by background processes of the method;

wherein the designated sources may be of types designated/configured by the method and/or configured by a user and stored in such a way as to be specific to said user;

The method may include additional categories and allow for localization and/or customization of the headings.

Some embodiments may include a comprehensive navigation user interface component that shows all known relationship endpoints for a designated entity for at least the categories: Contacts, Tasks, Notes, Meetings, Events, Reminders, Projects, e-mails, files. The user interface component may receive user input to facilitate filtering, sorting, and activation mechanism where a target is selected, thus becoming the current designated element and causing the comprehensive navigation component content to be updated based on newly selected element as the current context.

The navigation component may include additional categories and may allow for localization and/or customization of the headings. The navigation may be implemented within each type of client and may exist in different embodiments in each, depending on the user interface framework, device form factor, etc. The navigation component, however, retains the salient functionality of facilitating navigation from a currently selected/visible PIM element to any first degree linked element (i.e., an element to which it is directly linked by an edge).

A menu user interface component may be provided to enable functionality for a user to establish any new built-in relationship between entities of categories: Contacts, Tasks, Notes, Meetings, Events, Reminders, Projects, e-mails, files—and the currently active element (also of one of the same categories). The menu component is implemented within each type of client and may exist in different embodiments in each, depending on the user interface framework, device form factor, etc. However, this component retains the salient functionality of facilitating manipulation of DRCPIMS' elements and relationships. The menu may include additional categories and allow for localization and/or customization of the headings.

A search user interface component may facilitate searching the graph datastore by:
- displaying a user interface input that allows a user to specify one or more of the categories of element to be returned (Contacts, Tasks, Notes, Meetings, Events, Reminders, Projects, e-mails, files);
- displaying a user interface input control that allows the user to specify whether to begin the search from the currently visible/selected element or search across all content without regard to an initial node starting point;
- displaying a user interface input for the user to specify the maximum number of edge traversal degrees/hops to travel;
- displaying a user interface input control that allows the user to restrict the types of relationships traversed; and
- displaying a user interface input control that collects text input for content filtering and, in the case of searches greater than first degree, whether the content matching applies to the node of highest degree returned, to intermediate nodes along the path, or both.

An e-mail to graph management engine component may operate as a 'background' process either on the same server as other components, or on other server(s). The e-mail to graph management engine listens via established e-mail protocols and upon detecting relevant events renders a node representation of an e-mail and creates edges to nodes representing "contacts" by looking up sender and other recipient information contained within the e-mail headers in the set of graphs labeled as contacts. If an email is deleted, the e-mail to graph management engine removes the node representation of the e-mail and its associated edges.

The graph rendering and removal performed by the e-mail to graph management engine may also include creation and removal of nodes whose lifespan is linked to the existence of an e-mail. System-managed nodes may in some cases be upgraded by the user to user-managed nodes which grants full functionality to them within the global navigation component, the menu component and the search component, and may exempt their automatic removal by this component's cleanup activity upon deletion of the e-mail(s) responsible for their creation.

The e-mail to graph management engine component interacts with the persistence engine component and creates edges to file-representative nodes to utilize a single physically stored instance of a file as an e-mail attachment.

In the DRCPIMS hosted e-mail scenario, the e-mail to graph management engine component may additionally manage local storage of the e-mail and attachments. Moreover, in organization hosting scenarios, this storage management activity creates additional edges to the nodes representing recipients of the e-mail and attachments such that a single copy of the message and attachments is shared by all user recipients within the organization.

A file to graph management engine component may be provided to operate as a 'background' process either on the same server as other components, or on other server(s). This component renders a node representation of files in monitored storage and removes node representation of files in monitored storage upon deletion of a monitored file. The 'node representation' contains metadata sufficient to identify the file for the purpose of enabling complete functionality within the set of categories (e.g., Contacts, Tasks, Notes, Meetings, Events, Reminders, Projects, e-mails, files). This component may create graph representations of files in monitored locations based on folders or on demand whenever a reference to the file is sought to be established via a component of the system.

The file to graph management engine component interacts with the e-mail engine component to preserve historical integrity of e-mails while minimizing physical storage by recognizing when a file node representation is referenced as an e-mail attachment and, upon proposed deletion of a file, makes a single copy of said file's version referenced as an attachment to a purpose-built location of persistent storage enabling the preservation of e-mail historical integrity and minimized storage footprint while providing independence to management of the content for the monitored file location that originally was the source of the e-mail attachment.

A class to graph persistence engine component may perform bi-directional data transfer and attribute and label (i.e., pseudo-schema) management between the persistence layer for non-transient data (comprising graph DBMS, document DBMS relational DBMS, and key-value-store DBMS) and the run-time types (represented by the categories of data) and e-mail and file management engine components.

The class to graph persistence engine component utilizes a set of 'mappings' of class and property names and graph datastore label and attribute names. The mappings are driven by custom attribute classes functioning as "decorators" applied to classes and member properties. The engine builds a shared master mapping of class and property metadata to label and attribute metadata and uses these mappings to drive dynamic query generation.

Referring to FIG. 7, an example of a method for writing data to datastores and reading data from datastores is shown. Both the write and read methods use a property-to-graph attribute mapping that is generated at compile-time from tags within the application code.

When the DRCPIMS system needs to write to a datastore, the system first locates the applicable mapping table for the type of object to be written to the datastore (702). The system then iterates through the properties of the object and compares its values to default values for each data type (704). If the property values of the object are equal to the default values (706), the system appends a previously generated command to unset or remove the attribute from the target node (708). If the property values of the object are not equal to the default values (706), the system appends the command to add or update the attribute on the target node with the property value of the object (710). The system then executes the dynamically generated datastore command to update the appropriate datastore (712).

After dynamically generated command is executed (712), the DRCPIMS system populates properties in the object from data in the datastore if a corresponding mapped attribute is present and the content type matches and expected data type (716). If no properly formatted attribute value is present in the object, default values are assigned to these properties (718). The object may then be returned to a caller of the method (720).

When the DRCPIMS system Needs to read from a datastore, the message beginning at step 714 is performed. To perform the read, the system has a data row that contains a label of a node or edge, and the system locates the applicable mapping table for the label of the node or edge (714). Then, the DRCPIMS system populates properties in a corresponding object from data in the datastore if a corresponding mapped attribute is present and the content type matches and expected data type (716). If no properly formatted attribute value is present in the object, default values from the datastore are assigned to these properties (718). The object is then returned to the caller of the read method (720).

The class to graph persistence engine component may define a set of relationship labels and representational classes that:

facilitate capture of user-initiated events as relations between PID nodes (Contacts, Tasks, Notes, Meetings, Events, Reminders, Projects, e-mails, files) within the graph with distinguishing label attributes and a timestamp: moving from any PID node to another, selecting an item from search results output, and editing an item;

facilitate ordering of query output of the class to graph persistence engine component based on node weight as determined by the presence and timestamps of relationships;

capture navigation events in a user-configurable FIFO log of user interface events implemented as relationships in the graph between a single node (the log reference node) and the subject nodes of the captured user interface activity;

enhance suggestions of navigation destinations based on the contents of the FIFO log; and facilitate recreation of navigation history through the graph by reading, in chronological order, the specially designated navigation-triggered relationship attributes from any node which is used ad hoc as a starting point.

The update queries that are generated by the class to graph persistence engine component may include database code to add and set or to remove attributes as necessary by comparing values to be updated with default/expected values defined in the custom "decorators."

While reading data from the graph DBMS, the class to graph persistence engine component may analyze the data returned from a query and locate the correct class type based on the labels in the data, use the mapping to set property values of the class instance with whatever values are present in the data, and provide defaults in the cases of missing elements.

A function and class library may be provided that runs within the same process as the engine for the purpose of prioritizing data presented as potential navigation destinations based on user-activity captured within the DRCPIMS application.

A Calendar-Day as node architecture may be provided, where a calendar day is represented as a node and most references to a date from one of the entities in the categories: Contacts, Tasks, Notes, Meetings, Events, Reminders, Projects, e-mails, files connect via an edge to the calendar-day node. Time is stored only when it is relevant and is captured as an attribute of the edge.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array.

The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines.

Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within a claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A personal information management (PIM) system comprising:
   one or more processors and one or more memories;
   wherein the one or more processors are configured to:
      maintain a plurality of datastores, including a graph datastore and a non-graph datastore;
      store in the graph datastore: nodes representing each item of personal information data (PID); and edges representing relationships between the PID items;
      generate a user interface which accepts user input selecting a first PID item;
      identify a first node in the graph datastore representing the first PID item;
      search the graph datastore to identify one or more additional nodes in the graph datastore which are connected by edges to the first node;
      extract a key from each of the one or more additional nodes;
      retrieve, from the non-graph datastore, one or more additional PID items identified by a respective matching key corresponding to the extracted key for each of the one or more additional nodes of the graph datastore; and
      present in the user interface the first PID item and the one or more additional PID items retrieved from the non-graph datastore.

2. The PIM system of claim 1, wherein the non-graph datastore comprises a document datastore.

3. The PIM system of claim 2, wherein the one or more processors are configured to perform text searches on text stored in the document datastore.

4. The PIM system of claim 1, wherein the one or more processors are configured to execute a file storage engine that segregates storage of the PID items by type.

5. The PIM system of claim 1, further comprising a key-value store, wherein keys in the key-value store correspond to keys associated with nodes in the graph datastore and entries in the non-graph datastore.

6. The PIM system of claim 1, wherein the one or more processors are configured to execute a class-to-graph persistence engine, wherein the class-to-graph persistence engine maintains a mapping of the nodes in the graph datastore to instances of corresponding classes in a PIM application executed by the one or more processors to generate the user interface.

7. The PIM system of claim 6, wherein the class-to-graph persistence engine coordinates searches that traverse both the graph datastore and a document datastore and combines search results from the graph datastore and the document datastore.

8. The PIM system of claim 6, wherein the class-to-graph persistence engine includes a node path prioritization engine that prioritizes search results that are output to the user interface.

9. The PIM system of claim 8, wherein the class-to-graph persistence engine includes a node path prioritization engine that generates edges in the graph datastore representing paths navigated by a user between nodes in the graph datastore.

10. The PIM system of claim 9, wherein the path prioritization engine prioritizes the search results based on weights associated with each node, the weights are determined by the frequency of the generated edges representing the user-navigated paths.

11. The PIM system of claim 1, wherein the one or more processors are configured to execute an email processing engine that extracts data from emails, creates corresponding nodes in the graph datastore and maps the nodes to the extracted email data.

12. A method for personal information management (PIM) comprising:
- maintaining a plurality of datastores, including a graph datastore and a non-graph datastore;
- storing in the graph datastore: nodes representing each item of personal information data (PID);
- and edges representing relationships between the PID items;
- generating a user interface which accepts user input selecting a first PID item;
- identifying a first node in the graph datastore representing the first PID item;
- searching the graph datastore to identify one or more additional nodes in the graph datastore which are connected by edges to the first node;
- extracting a key from each of the one or more additional nodes;
- retrieving, from the non-graph datastore, one or more additional PID items identified by a respective matching key corresponding to the extracted key for each of the one or more additional nodes of the graph datastore; and
- presenting in the user interface the first PID item and the one or more additional PID items retrieved from the non-graph datastore.

13. The method of claim 12, wherein the non-graph datastore comprises a document datastore.

14. The method of claim 12, further comprising segregating storage of the PID items by type.

15. The method of claim 12, further comprising maintaining a key-value store, wherein keys in the key-value store correspond to keys associated with nodes in the graph datastore and entries in the non-graph datastore.

16. The method of claim 12, further comprising maintaining a mapping of the nodes in the graph datastore to instances of corresponding classes in a PIM application executed by the one or more processors to generate the user interface.

17. The method of claim 16, further comprising performing one or more searches that traverse both the graph datastore and a document datastore and combining search results from the graph datastore and the document datastore.

18. The method of claim 12, further comprising generating edges in the graph datastore representing paths navigated by a user between nodes in the graph datastore.

19. The method of claim 18, further comprising determining weights based on frequencies at which edges representing the user-navigated paths are generated, and prioritizing search results based on the weights associated with each node.

20. The method of claim 12, further comprising extracting data from emails, creating corresponding nodes in the graph datastore and mapping the nodes to the extracted email data.

* * * * *